March 24, 1970 H. E. RIORDAN ET AL 3,501,946
FLUID OUTPUT CLOSED-LOOP ACCELEROMETER
Filed Dec. 28, 1966 2 Sheets-Sheet 1

INVENTORS
Hugh E. Riordan &
Harold J. Strout

BY S. R. Giarratana &
K. A. Ohralik
ATTORNEYS

March 24, 1970  H. E. RIORDAN ET AL  3,501,946
FLUID OUTPUT CLOSED-LOOP ACCELEROMETER Filed Dec. 28, 1966  2 Sheets-Sheet 2

INVENTORS
Hugh E. Riordan &
Harold J. Straub
BY S. A. Giarratana &
K. A. Ohralik
ATTORNEYS United States Patent Office 3,501,946
Patented Mar. 24, 1970

3,501,946
FLUID OUTPUT CLOSED-LOOP
ACCELEROMETER
Hugh E. Riordan, Wyckoff, and Harold J. Straut, Wayne,
N.J., assignors to Singer-General Precision, Inc., a corporation of Delaware
Filed Dec. 28, 1966, Ser. No. 605,253
Int. Cl. G01p 15/02
U.S. Cl. 73—515                                    4 Claims

ABSTRACT OF THE DISCLOSURE

The patent specification discloses an accelerometer which produces an output in the form of a differential fluid pressure or mass flow that is linearly related to the input accelerational movement. The accelerometer includes two balanced fluid containing chambers separated by a movable seismic mass. A fluid balance within the chambers is maintained by a pair of control orifices which are juxtaposed to the seismic mass. When an acceleration force is encountered, the seismic mass is moved relative to the control orifices. This causes a change in pressure within the chambers from which the acceleration can be determined.

BACKGROUND OF THE INVENTION

The present invention relates to a fluid control system and more particularly to a fluid output closed-loop accelerometer which provides an output in the form of a differential fluid pressure that is linearly related to input acceleration.

In the present sophisticated technology of missile and space flight systems, data representing the movements of a traveling vehicle must be monitored and used to control the operation of the system. Particularly primary inertial quantities such as translational acceleration and angle or angular rate of movement must be known and compared to correspond with computed flight patterns. Prior to recent developments in the art, most guidance and control systems worked with electrical sensing and signal translation equipment. Recently the state of the art of fluid flow devices has progressed so that non-electrical control systems, using fluids as the power and signal medium, are being used as sensors of primary inertial quantities.

SUMMARY OF THE INVENTION

The present invention relates to an accelerometer capable of operating in such non-electrical guidance and control spstems which provides an output in the form of a differential fluid pressure or mass flow that is directly trol systems which provides an output in the form of a seismic mass which is suspended on an elastic structure to provide one degree of translational movement. The motion of the seismic mass along the axis of freedom is restrained by a fluid feedback system so that a small translation of the mass results in a large differential pressure across an output transducer means in such a direction that the resulting force on a seismic mass resists its motion. The transducer means is pressure sensitive, and may be a piston actuator, a bellows or diaphragm device or suitable electrical output pressure transducer. The system is adapted so that changes in movement of the seismic mass result in changes of pressure in a closed loop fluid flow system which pressure change is transmitted to the transducer which is coupled to an appropriate utilization means. Because it is a true closed loop force balance instrument, attributes such as band pass, linearity and dynamic range are excellent.

Among the objects of the present invention are the provision of a fluid output closed-loop accelerometer to measure changes in acceleration of a moving vehicle; to provide an accelerometer to produce an output in a form of a differential fluid pressure that is linearly related to input acceleration; and to provide a fluid flow device to create changes in pressure which are controlled by the movement of a mass within a balanced fluid system.

Other objects and further scope of applicability of the present invention will become apparent from the detailed description to follow, taken in conjunction with the accompanying drawings described below.

DESCRIPTION OF THE PREFERRED EMBODIMENTS

Figure 1:
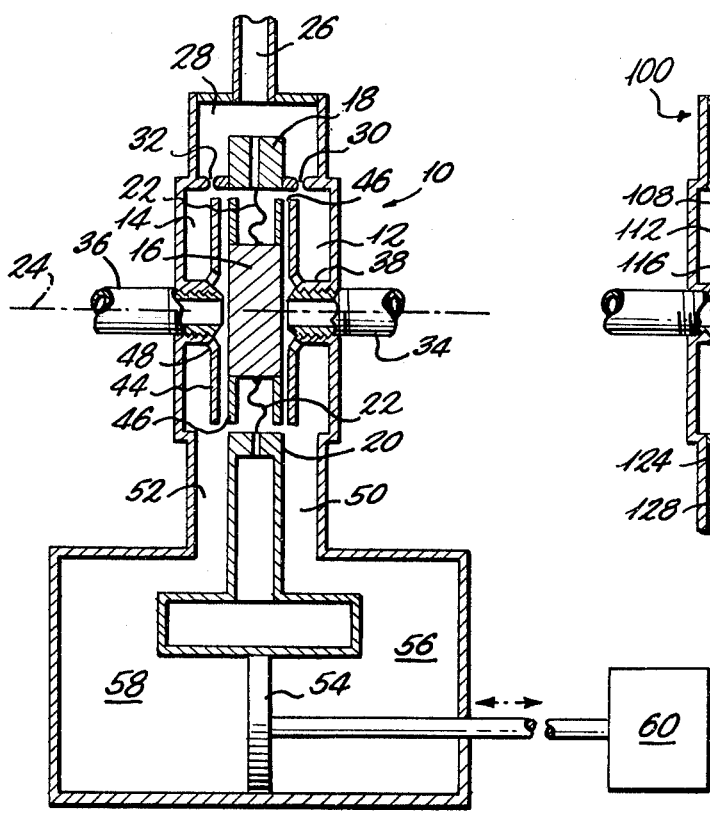
FIGURE 1 is an illustration of one embodiment of the accelerometer of the present invention.

As shown in FIGURE 1 the closed-loop accelerometer 10 has defined therein two chambers 12 and 14, which are structurally the same and provide identical fluid flow paths in the no-load condition. The chambers 12 and 14 are separated by a seismic mass 16 which is movably mounted on two supports 18 and 20 by means of a movable suspension diaphragm seal 22, which also separates the chambers 12 and 14. The seismic mass 16 is symmetrical with respect to the sensitive axis 24 of the accelerometer 10, which axis is the line along which input acceleration is sensed. A supply port 26 is coupled to a supply chamber 28. The supply chamber 28 is connected to the right-hand chamber 12 by a sonic inlet orifice 30 and to the left-hand chamber 14 by means of sonic inlet orifice 32. The fixed sonic inlet orifices 30 and 32 are defined in separate discs, which are watch jewels provided with bores matched to a very high precision.

Figure 2:
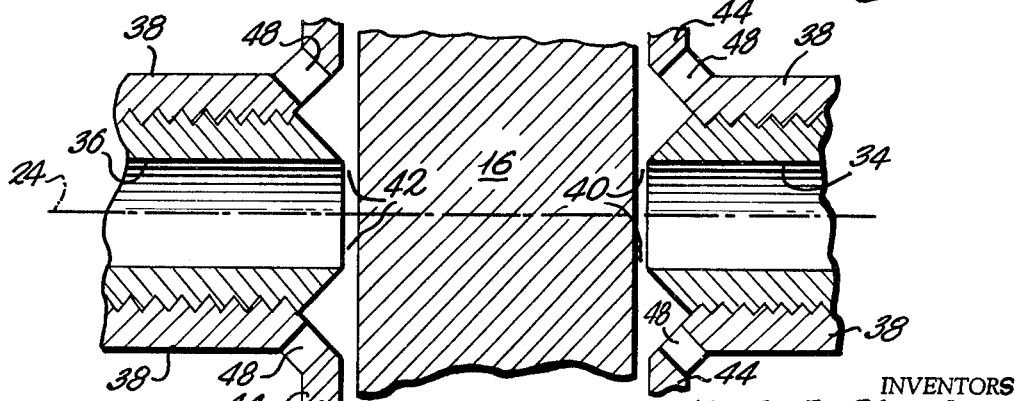
FIGURE 2 is an enlarged partial view of the control orifice area of the accelerometer of FIG. 1.

A pair of annular flow tubes 34 and 36 which are vented to a suitable low pressure sink (not shown) open into the respective chambers 12 and 14. As shown in more detail in FIGURE 2, the flow tubes 34 and 36 are shown threadedly mounted to extensions 38 of the chamber walls. Annular control orifices 40 and 42 are formed between the ends of the flow tubes 34 and 36 and the seismic mass 16, which orifices control the flow of fluid from the chambers 12 and 14 out through the tubes 36 and 38, as will be described in detail hereinbelow.

The threaded mounting of the flow tubes 34 and 36 allows for adjustment of the control orifice openings 40 and 42 in order to adjust the device for zero output at zero input acceleration. Plates 44 attached to the control chamber extensions 38, extend out perpendicularly to the sensitive axis 24 within each chamber 12 and 14. These plates 44 cooperate with flanges 46 extending from the seismic mass 16 to provide a damping of the movement of the seismic mass 16.

The chambers 12 and 14 are provided with flow ports 48 adjacent the control orifices 40 and 42 at the intersection of the chamber wall extensions 38 and the plates 44. These flow ports 48 act to provide the major fluid flow path in the chambers 12 and 14 to the control orifices 40 and 42.

The respective chambers 12 and 14 are connected to outlet ports 50 and 52. The output ports 50 and 52 are connected to a device which is pressure sensitive, but which does not require a steady input flow. One form of such a pressure sensitive device is shown as a piston actuator 54 which separates a right-hand chamber 56 and a left-hand chamber 58. The piston actuator 54 is coupled to a utilization device 60 which detects the net force applied to the piston. It will be appreciated that while a piston actuator is shown in the diagram, a bellows device or suitable electrical output pressure transducer could be used if desired.

The operation of the accelerometer 10 may be described as follows: The supply port 26 is connected to a fluid source which may be either liquid or gas, at a substantially constant pressure. The right- and left-hand flow chambers are vented outside the accelerometer instrument 10 to a suitable low pressure sink (not shown) through the flow tubes 34 and 36. The supply port 26 and the control orifices 40 and 42 are adjusted so that in the absence of applied acceleration, the seismic mass 16 and its suspension diaphragm seal 22 are in their neutral position and the fluid flow from the supply chamber 28 through the chambers 12 and 14 out of the control orifices 40 and 42 are equal resulting in an equal pressure level within the chambers 12 and 14 and in the pressure sensing device. When an acceleration force is applied to the accelerometer instrument 10 along the sensitive axis 24, for example to the right, the seismic mass 16 is deflected toward the left, thereby increasing the opening of the right-hand control orifice 40 and decreasing the opening of the left-hand control orifice 42. This movement changes of the seismic mass 16 reduces the pressure in chamber 12 because of the increasing venting action of the right-hand control port 40. Correspondingly the pressure in the chamber 28 is increased because the opening of the left-hand control orifice 42 is reduced. The suspension diaphragm seal 22 is sufficiently flexible so that its elastic reaction is negligible, and the seismic mass 16 moves until the net force on the seismic mass 16 resulting from the pressure difference between the chambers 12 and 14 exactly balances the inertial reaction produced by the applied acceleration. The difference in pressure between the chambers 12 and 14 will thus be proportional to the applied acceleration.

Rapid motion of the mass 16 in response to changes in applied acceleration is damped by a squeeze film action which is developed on the fluid between the seismic mass 16 and flanges 46 and the plates 44 formed parallel thereto.

The changes in pressure in the chambers 12 and 14 are transmitted to the lower chambers 56 and 58 which apply a net force to the piston 54 which net force is proportional to the applied acceleration. The net force applied to the piston 54 is detected by the utilization device 60 which thus detects the applied acceleration.

Figure 3:
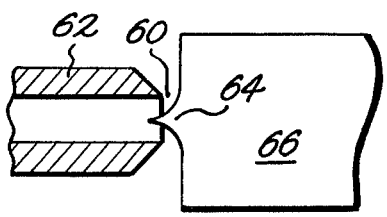
FIGURES 3 and 4 are alternate embodiments of the control orifice portion of the accelerometer shown in FIGURE 1.
Figure 4:
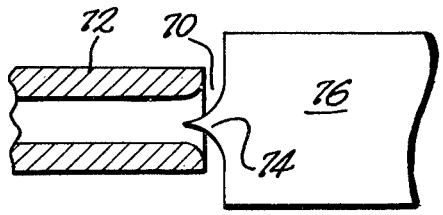

FIGURES 3 and 4 illustrate two alternative arrangements of control orifice geometry which will provide predictable characteristics over a range of flow conditions. FIG. 3 shows a control orifice opening 60 formed by the bevelled end of a flow tube 62 positioned around a pointed extension 64 on a seismic mass 66. FIG. 4 illustrates a control orifice opening 70 formed by the end of a flow tube 72 the inner edge of which is arcuately tapered to generally parallel the surface of a pointed extension 74 on a seismic mass 76.

Regardless of whether the fluid is a liquid or a gas and independently of the flow characteristics of the inlet and control orifices, and of the variations in the supply pressure, a strict proportionality of the differential pressure to apply acceleration is preserved.

If a gas is used as a working fluid, and the orifices, and the supply and exhaust pressures are so selected that the orifices are operating in the sonic flow region, the following equations apply:

The supply rate of mass flow $Ms$ through an inlet orifice 30 or 32 is defined in the following equation:

$$Ms = \frac{0.53 P_s A_s}{G\sqrt{T_s}} \quad (1)$$

in which $Ps$ is supply pressure, $As$ is the area of the inlet orifice, G is acceleration due to gravity and $Ts$ is absolute temperature.

The control rate of mass flow $Mc$ through a control orifice 40 or 42 is given by the following:

$$Mc = \frac{0.53 P_c A_c}{G\sqrt{T_c}} \quad (2)$$

in which $Pc$ is chamber pressure, $Ac$ is the area of the control orifice, that is the area of the annular opening defined between the seismic mass and the flow control tubes and $Tc$ is chamber temperature.

In the accelerometer shown in FIGURE 1, during steady state conditions in the absence of acceleration forces the inlet flow equals the control flow, $$Ms = Mc \quad (3)$$

or substituting the values from Equations 1 and 2 above and eliminating the constants which are the same, the following equation is obtained:

$$\frac{P_s A_s}{\sqrt{T_s}} = \frac{P_c A_c}{\sqrt{T_c}} \quad (4)$$

From Equation 4 the chamber pressure $Pc$ may be written as $$Pc = Ps \sqrt{\frac{T_c}{T_s}} \frac{A_s}{A_c} \quad (5)$$

Letting the subscripts 1 and 2 refer to the chambers on opposite sides of the diaphragm then the control orifice areas may be represented by the following equations:

$$Ac_1 = Ao + KcX \quad (6)$$

$$Ac_2 = Ao - KcX \quad (7)$$

in which $Ao$ is the nominal area of the control orifice, $Kc$ is a constant, and X is the displacement of the seismic mass.

The forces on each side of the seismic mass $F_1$ and $F_2$ are equal to $$F_1 = Pc_1 Ap \quad (8)$$

and $$F_2 = Pc_2 Ap \quad (9)$$

in which $Ap$ is the effective piston area of the diaphragm and the seismic mass.

Neglecting the diaphragm stiffness and damping then the applied acceleration $\ddot{y}$ multiplied by the seismic mass $m$ is $$m\ddot{y} = F_1 - F_2 = Ap(Pc_1 - Pc_2) \quad (10)$$

Thus the differential pressure is a linear function of acceleration. Substituting of Equations 5, 6, and 7 in Equation 10 then $$F_1 - F_2 = Ap Ps \sqrt{\frac{T_c}{T_s}} \left[ \frac{A_s}{Ao + KcX} - \frac{A_s}{Ao - KcX} \right] \quad (11)$$

or $$F_1 - F_2 = \frac{Kc Ap As Ps}{Ao^2} \sqrt{\frac{T_c}{T_s}} \left[ \frac{2X}{1 - \left(\frac{KcX}{Ao}\right)^2} \right] \quad (12)$$

Thus if $KcX$ is much less than $Ao$ the motion-force relationship approaches linearity.

Figure 5:
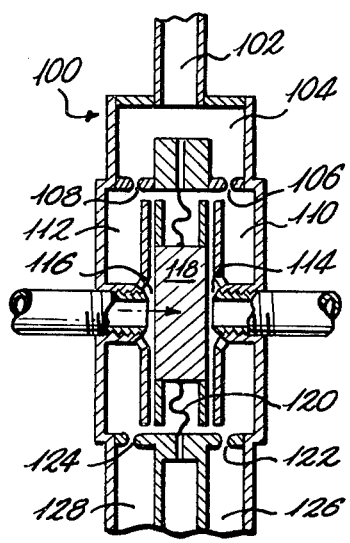
FIGURE 5 is an illustration of a second embodiment of FIG. 1.

A fluid flow accelerometer 100 shown in FIGURE 5 is similar to that described in FIGURE 1 but having a dicerent arrangement of ports and orifices where the desired output is a differential flow rather than a differential pressure. Fluid is introduced in a supply inlet 102 through an inlet chamber 104. The fluid is then separated through two sonic inlet orifices 106 and 108 into respective chambers 110 and 112. A pair of control orifices 114 and 116 cooperate with a seismic mass 118 mounted by means of a suspension seal diaphragm 120. Two outlet orifices 122 and 124 couple the chambers 110 and 112 with outlet ports 126 and 128. Applied acceleration will cause movement of the seismic mass 118 relative to the control orifices 114 and 116 and produce a pressure differential in the same manner as described with reference to the accelerometer of FIG. 1. This pressure differential will create a difference in flow out of the outlet orifices 122 and 124 which will correlate with the applied acceleration.

The differential output flow out of the outlet orifices 122 and 124 is proportional to acceleration as can be seen by the following equations in which the same symbols represent the same variables of Equations 1 to 12. The rate of fluid flow supply $Ms$ equals $$Ms = Me + Mc \tag{13}$$

in which $Me$ is the outlet orifice fluid flow rate, or $$\frac{0.53\, PsAs}{G\sqrt{Ts}} = \frac{0.53\, PcAe}{G\sqrt{Tc}} + \frac{0.53\, PcAc}{G\sqrt{Tc}} \tag{14}$$

in which $Ae$ is the area of the outlet orifice.

Equation 14 may be rewritten as $$PsAs\sqrt{\frac{Tc}{Ts}} = Pc(Ae + Ac) \tag{15}$$

As in Equation 10, the force differential at opposite sides of the seismic mass is $$F_1 - F_2 = Ap(Pc_1 - Pc_2) \tag{16}$$

Substituting Equations 6, 7 and 15 in Equation 16, $$(F_1 - F_2) = ApAsPs\sqrt{\frac{Tc}{Ts}}\left[\frac{1}{(Ae+Ao+KcX)} - \frac{1}{(Ae+Ao-KcX)}\right] \tag{17}$$

or $$(F_1 - F_2) = \frac{KcApAsPs}{(Ae+Ao)^2}\sqrt{\frac{Tc}{Ts}}\left[\frac{-2X}{1-\frac{Kc^2X^2}{(Ae+Ao)}}\right] \tag{18}$$

The differential flow rates $(Me_1 - Me_2)$ out of the two outlet orifices may be represented as follows:

$$Me_1 - Me_2 = \frac{0.53\, Pc_1Ae}{\sqrt{Tc}} - \frac{0.53\, Pc_2Ae}{\sqrt{Tc}} = \frac{0.53\, Ae(Pc_1 - Pc_2)}{\sqrt{Tc}} \tag{19}$$

From Equation 16 it is seen that $$P_{c1} - P_{c2} = \frac{F_1 - F_2}{Ap} \tag{20}$$

Substituting the expression of Equation 20 for $(Pc_1 - Pc_2)$ in Equation 19 the following equation results:

$$Me_1 - Me_2 = \frac{0.53\, Ae}{G\sqrt{Tc}Ap}(F_1 - F_2) \tag{21}$$

From Equation 19 it will be apparent that, the differential flow varies linearly with the differential force $F_1 - F_2$ and therefore varies linearly with the applied acceleration.

Figure 6:
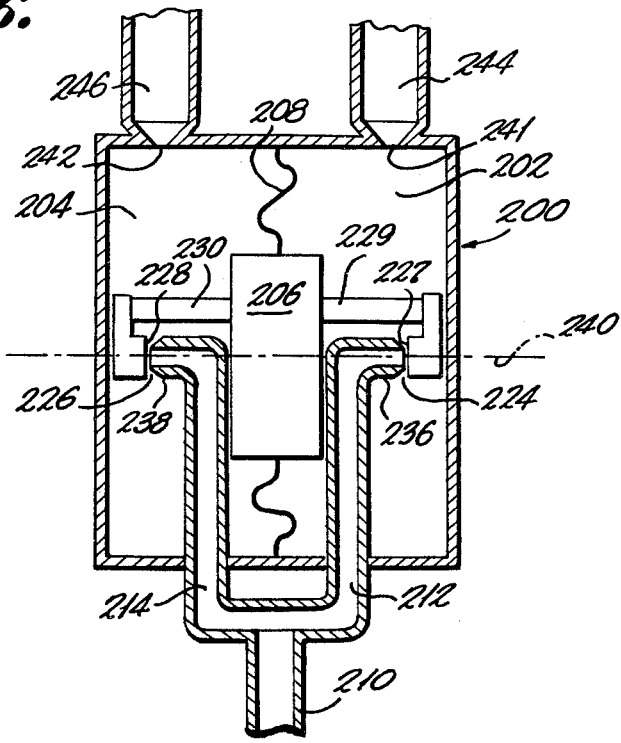
FIGURE 6 is an illustration of another embodiment of the invention.

The accelerometer 200 of FIG. 6 provides a differential flow output which is linear with respect to acceleration if sonic gas flow is maintained. It also provides absolute linearity in the relationship between displacement and acceleration.

The accelerometer 200 comprises a right-hand chamber 202 and a left-hand chamber 204 separated by a seismic mass 206 and a suspension diaphragm 208 on which the mass 206 is mounted. Fluid is introduced into the chambers 202 and 204 through a fluid supply port 210 which is coupled to a right-hand supply conduit 212 and a left-hand supply conduit 214. A pair of control orifices 224 and 226 are formed between flat faces 227 and 228 on arms 229 and 230 and nozzles 236 and 238 formed as extensions of the supply conduits 212 and 214. The control orifices are the annular gaps between walls forming the nozzles 236 and 238 and the flat faces 227 and 228. The arms 229 and 230 are mounted on the seismic mass 206 and are arranged so that the flat faces 227 and 228 are positioned on and normal to the sensitive axis 240 of the accelerometer 200. Fluid flows from the chambers 202 and 204 through outlet orifices 241 and 242 to outlet conduits 244 and 246.

During equilibrium when no accelerational forces are present, two paths of equal fluid flow are present; one from the fluid supply port 210, through the supply conduit 212 and control orifice 224 into the chamber 202. The path is completed through outlet orifice 241 and outlet conduit 244. The second flow path is completed from fluid supply 210 through the supply conduit 214 and the control orifice 226 into the chamber 204. This second flow path is completed through outlet orifice 242 and outlet conduit 246. When an acceleration is received along the sensitive axis 240, the seismic mass 206 is moved in a direction opposite to the acceleration force. For example if acceleration toward the right is applied, the seismic mass 206 will move to the left. This movement will cause the face 227 on the arm 229 to approach the nozzle 236 thereby reducing the control orifice 224 and restricting flow therethrough. The movement of the seismic mass 206 at the same time will open the control orifice 226 by moving the face 228 of arm 230 away from the nozzle 238. With the supply pressure remaining constant, a greater flow will result through control orifice 226 into chamber 204. This difference in flow rate will increase the pressure in chamber 204 relative to the pressure in chamber 202. The resulting difference in pressure will apply a net force to the mass 206 toward the right. The pressure differential will change until the resulting net force equals the reaction to the applied acceleration. Accordingly the pressure differential will be proportional to the applied acceleration. The flow rates out of the orifices 241 and 242 will depend upon the pressures in the chambers 202 and 204. Thus, difference in flow rates out of the orifices 240 and 242 will correlate with the applied acceleration along the sensitive axis.

It will be appreciated that the accelerometer 200 may be adapted to provide a pressure output, similar to that described with reference to FIGURE 1 by the addition of an exhaust port to each of the pressure chambers 202 and 204 which are coupled to a suitable pressure sensing means.

The displacement of mass 206 and the differential flow output of the accelerometer 200 shown in FIGURE 6 is linear with respect to acceleration shown by the following equations. The inlet fluid flow rate $Ms$ is defined as $$Ms = \frac{0.53 PsAc}{G\sqrt{Ts}} \tag{22}$$

and is equal to the outlet flow rate $Mc$ which is defined as $$Me = \frac{0.53 PcAe}{G\sqrt{Tc}} \tag{23}$$

and $$Me = Ms \tag{24}$$

or $$\frac{PcAe}{\sqrt{Tc}} = \frac{PsAc}{\sqrt{Ts}} \tag{25}$$

From Equation 25 it is seen that the chamber pressure $Pc$ may be defined as $$Pc = \frac{Ps}{Ae}\sqrt{\frac{Tc}{Ts}}Ac \tag{26}$$

By substituting expression of Equation 26 in Equations 6 to 9 above the differetntial force on the seismic mass is $$F_1 - F_2 = Ap \frac{Ps}{Ae}\sqrt{\frac{Tc}{Ts}}[(Ao+KcX)-(Ao-KcX)] \quad (27)$$

or $$F_1 - F_2 = Kc \frac{Ap}{Ae} AoPs\sqrt{\frac{Tc}{Ts}}(2X) \quad (28)$$

From this Equation 28 it can be seen that the differential force is an absolute linear function of the seismic displacement. Since as shown by Equation 23 the outlet flow is a linear function of chamber pressure, $Me_1 - Me_2$ is proportional to $F_1 - F_2$. Since the net force $F_1 - F_2$ applied to the mass as a result of the pressure differential is proportional to the applied acceleration, the flow differential $Me_1 - Me_2$ is proportional to the applied acceleration.

It will be appreciated that the above description is illustrative only and not limiting and many modifications may be made to the specific embodiment described above without departing from the spirit and scope of the invention, which is defined in the appended claims.

What is claimed is:
1. An accelerometer, comprising in combination:
   (a) a housing having a longitudinal axis which will define the sensitive axis of the accelerometer at right angles thereto, said housing having first and second ends at opposite ends thereof;
   (b) a first and second chamber (12, 14) defined therein between said ends, including chamber walls with extensions (38) with internal threads;
   (c) a symmetrical seismic mass (16) movably mounted separating said chambers including first and second supports (18, 20) at said first and second ends for supporting said mass;
   (d) a diaphragm seal (22) holding said mass to said supports also separating said chambers;
   (e) a supply chamber (28) in said first end with a supply port (26) for feeding fluid to said chambers;
   (f) first and second sonic inlet orifices (30, 32) connecting said supply chamber (28) to said first and second chambers (12, 14) said orifices being defined in first and second discs with bores therein;
   (g) first and second flow tubes (34, 36) threadedly mounted in said chamber wall extensions (38) including annular control orifices (40, 42) formed between flow tubes (34, 36) and said seismic mass (16) which orifices control the flow of fluid from the chambers (12, 14) out through the tubes (36, 38);
   (h) flow ports (48) in said chambers adjacent said control orifices (40, 42) acting to provide a major fluid flow path in said chambers (12, 14) to the control orifices (40, 42);
   (i) outlet ports (50, 52) at the other end of said housing, said chambers (12, 14) being connected thereto;
   (j) a pressure transducer (54) responsive to pressure changes in said chambers (12, 14), fed by said outlet ports (50, 52); and
   (k) a utilization device (60) coupled to said pressure transducer (54).

2. The accelerometer of claim 1 wherein said mass is symmetrically mounted by a suspension diaphragm between chambers whereby movement of said seismic mass toward one of said flow tube ends, restricting fluid flow through the first control orifice, results in a corresponding enlarging of the second control orifice allowing greater flow therethrough.

3. The accelerometer of claim 1 wherein said seismic mass includes flanges which cooperate with plates in said chambers to entrap fluid therebetween to produce a damping effect on the movement of said mass.

4. The accelerometer of claim 1 wherein said seismic mass includes a pair of pointed projections axially aligned with said flow tubes and extending into said flow tubes.

References Cited
UNITED STATES PATENTS

| | | | |
|---|---|---|---|
| 3,014,373 | 12/1961 | Lindbom | 73—515 |
| 3,089,343 | 5/1963 | Rule | 73—516 |
| 3,221,562 | 12/1965 | Borcher et al. | 73—515 |
| 3,224,278 | 12/1965 | Reid et al. | 73—515 XR |
| 3,315,531 | 4/1967 | Grimland | 73—515 |

JAMES J. GILL, Primary Examiner

PO-1050
(5/69)

UNITED STATES PATENT OFFICE
CERTIFICATE OF CORRECTION

Patent No. 3,501,946          Dated 3/24/70

Inventor(s) H.E. Riordan et al

It is certified that error appears in the above-identified patent and that said Letters Patent are hereby corrected as shown below:

Column 1, line 51, correct the spelling of "systems".
Column 1, line 53, remove line 53 and substitute "related to input acceleration. The instrument consists of a
Column 3, line 28, change the word "changes" to --change--.
Column 4, line 66, correct the spelling of "different".
Column 7, line 2, correct the spelling of "differential".

SIGNED AND
SEALED
JUL 28 1970

(SEAL)
Attest:

Edward M. Fletcher, Jr.
Attesting Officer

WILLIAM E. SCHUYLER, JR.
Commissioner of Patents